US010820170B1

(12) United States Patent
Huberman et al.

(10) Patent No.: US 10,820,170 B1
(45) Date of Patent: Oct. 27, 2020

(54) TIME OFFSET BASED SYNCHRONIZATION IN MOBILE DEVICE LOCALIZATION

(71) Applicant: MAPSTED CORP., Mississauga (CA)

(72) Inventors: Sean Huberman, Guelph (CA); Joshua Karon, Toronto (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/582,059

(22) Filed: Sep. 25, 2019

(51) Int. Cl.

| | |
|---|---|
| ***H04W 4/33*** | (2018.01) |
| ***H04W 4/02*** | (2018.01) |
| ***H04L 29/08*** | (2006.01) |
| ***H04B 17/318*** | (2015.01) |
| ***H04W 88/08*** | (2009.01) |
| ***H04W 64/00*** | (2009.01) |

(52) U.S. Cl.
CPC ............ *H04W 4/33* (2018.02); *H04B 17/318* (2015.01); *H04L 67/12* (2013.01); *H04W 4/027* (2013.01); *H04W 64/006* (2013.01); *H04W 88/08* (2013.01)

(58) Field of Classification Search
CPC ..... H04W 4/33; H04W 4/027; H04W 64/006; H04W 88/08; H04B 17/318; H04L 67/12
See application file for complete search history.

(56) References Cited

U.S. PATENT DOCUMENTS

| | | | | |
|---|---|---|---|---|
| 8,102,784 | B1 * | 1/2012 | Lemkin | G01S 5/0289 370/255 |
| 2009/0043504 | A1 | 2/2009 | Bandyopadhyay et al. | |
| 2011/0188389 | A1 * | 8/2011 | Hedley | G01S 5/0226 370/252 |
| 2013/0137452 | A1 * | 5/2013 | Bevan | G01S 5/021 455/456.1 |
| 2015/0185309 | A1 * | 7/2015 | Pu | H04W 64/003 455/456.1 |
| 2016/0379074 | A1 | 12/2016 | Nielsen et al. | |
| 2019/0222959 | A1 * | 7/2019 | Duan | H04W 4/023 |
| 2019/0324111 | A1 * | 10/2019 | Marshall | G01S 5/0036 |

* cited by examiner

*Primary Examiner* — Ernest G Tacsik

(57) ABSTRACT

A method and system of time-offset based synchronization for mobile device indoor navigation and positioning. The method, executed in a processor of a server computing device, comprises receiving, at a set of fixed nodes, a wireless signal transmission from a moving node; deriving a time difference of flight (TDOF) offset amongst the set of fixed nodes and the moving node; and localizing the moving node at a given time based at least in part on the TDOF offset.

16 Claims, 4 Drawing Sheets

TIME OFFSET BASED SYNCHRONIZATION IN MOBILE DEVICE LOCALIZATION

TECHNICAL FIELD

The disclosure herein relates to the field of mobile device navigation and positioning.

BACKGROUND

Indoor navigation or positioning typically involves calibration of specific coordinate positions or locations with regard to signal parameters detectable by various mobile device sensors during traversal of a sequence of such positions. The signal parameters may typically include one or more of received wireless signal strength (RSS), wireless signal connectivity, inertial, magnetic, barometric and optical measurements. Time of flight based solutions may be applied generally only when fixed nodes and a moving node both share a common time reference frame, in order to localize the moving node within that reference frame.

DETAILED DESCRIPTION

Figure 1:
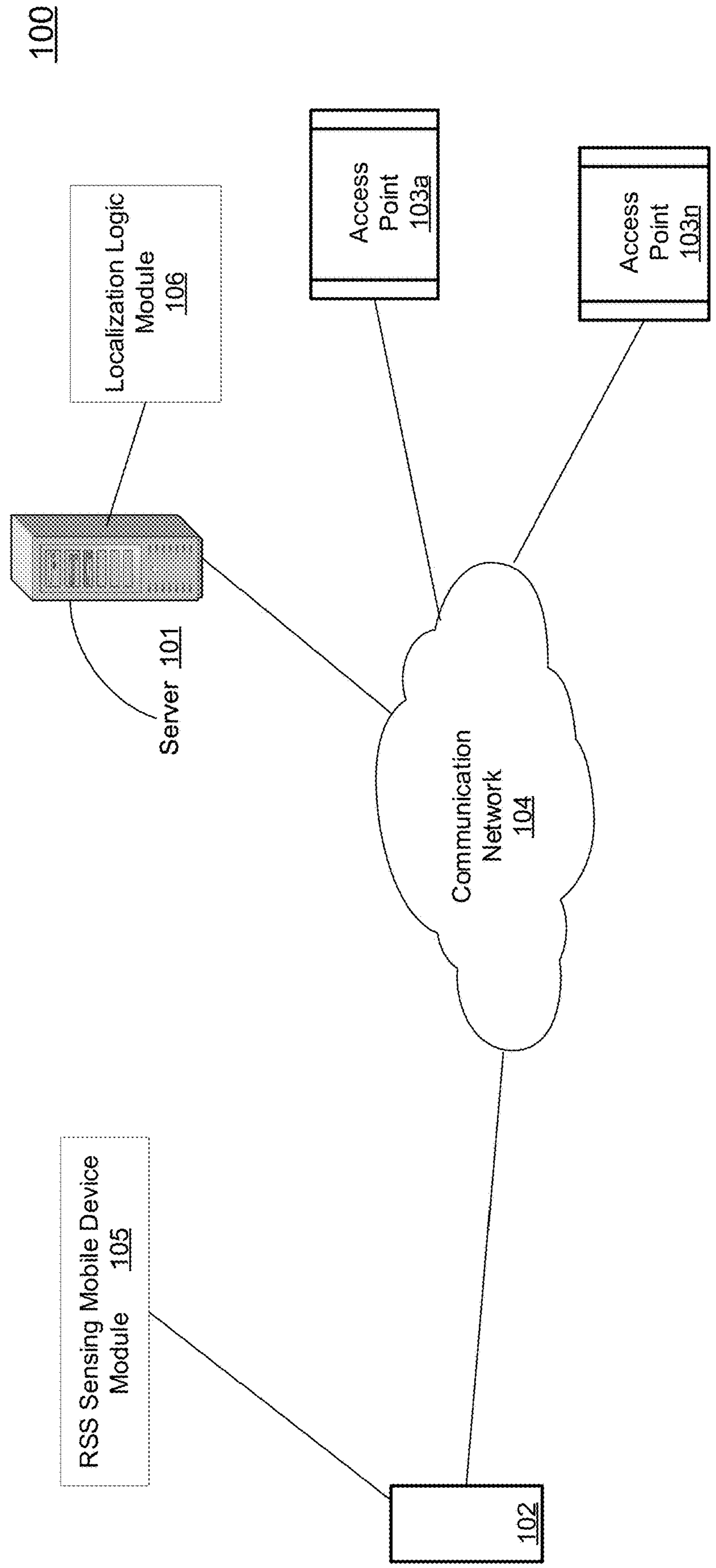
FIG. 1 illustrates, in an example embodiment, a system for mobile device localization for indoor navigation and positioning.

Among other benefits, the disclosure herein provides for time synchronization between multiple fixed and a moving, disconnected devices without dedicated and expensive time synchronization hardware. The disconnected devices, both fixed and moving, are referred to herein as nodes or nodes as variously referred to herein. Such time synchronization enables the use of more precise positioning algorithms such as the time difference of flight (TDOF) method, which can advantageously provide mobile device positioning, or localization, accuracies of less than a meter.

Normally time synchronization is achieved by having a master clock send clock corrections to the devices, or nodes, within the system. Advantageously, instead of updating the clocks on the devices, the time offset of each device is mathematically solved for. This calculated time offset is then be used to localize the moving node. The advantages of this system are that (i) It can be done without dedicated time synchronization hardware and (ii) the need to correct device clocks is avoided.

Provided is a method of a method and system of time-offset based synchronization for mobile device indoor navigation and positioning. The method, executed in a processor of a server computing device, comprises receiving, at a set of fixed nodes, a wireless signal transmission from a moving node; deriving a time difference of flight (TDOF) offset amongst the set of fixed nodes and the moving node; and localizing the moving node at a given time based at least in part on the TDOF offset.

Also provided is a server computing system for of time-offset based synchronization for mobile device indoor navigation and positioning. The server computing system comprises a processor and a memory. The memory includes instructions executable in the processor to receive, at a set of fixed nodes, a wireless signal transmission from a moving node; derive a time difference of flight (TDOF) offset amongst the set of fixed nodes and the moving node; and localize the moving node at a given time based at least in part on the TDOF offset.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). An embedded device as described herein utilizes processors, memory, and logic instructions stored on computer-readable medium. Embodiments described herein may be implemented in the form of computer processor-executable logic instructions or programs stored on computer memory mediums.

FIG. 1 illustrates, in an example embodiment, mobile device localization system 100 for mobile device indoor navigation and positioning, using RSS sensing mobile device 102, a set of access point devices 103*a-n* and server computing device 101 (variously referred to herein as server device 101 and server 101). RSS sensing mobile device 102 may include a processor, memory and associated circuitry to accomplish any one or more of telephony, data communication, and data computing. RSS sensing mobile device 102 are in communication with access point devices 103*a-n* deployed within the indoor area and server device 101. The RSS wireless signal source as referred to herein may be wireless access point devices 103*a-n* deployed within the indoor area, for example incorporating different wireless signal communication protocols such as Wi-Fi™, Bluetooth®, and other wireless signal protocols. In embodiments, the fixed node(s) as referred to herein are implemented by one or more of access point devices 103*a-n* deployed for indoor wireless communications, and the moving device as referred to herein is implemented using mobile device 102, variously referred to herein as RSS sensing mobile device 102. RSS sensing mobile device 102 may include fingerprint data of a surrounding or proximate pedestrian area, such as a factory manufactory floor or multiple floors, stored in local memory. In other variations, RSS sensing mobile device 102 may be connected within a computer network communication system 104, including the internet or other wide area network, to remote server computing device 101 that stores, in a fingerprint database, the fingerprint data of the pedestrian area, the latter being communicatively accessible to RSS sensing mobile device 102 for download of the fingerprint data.

An indoor route as referred to herein, in embodiments, may encompass an indoor area within any one or a combination of a manufacturing facility, a shopping mall, a warehouse, an airport facility, a hospital facility, a university campus facility or any at least partially enclosed building.

RSS sensing mobile device 102 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. RSS sensing mobile device 102 may also include capability for detecting and communicatively accessing ambient wireless communication signals according to various signal protocols including but not limited to any of Bluetooth® and Bluetooth® Low Energy (BLE), Wi-Fi™, RFID, and also satellite-based navigations signals including global positioning system (GPS) signals. RSS sensing mobile device 102 further includes the capability for detecting, via sensor devices, and measuring received signal strengths (RSS) from sources of wireless signals in accordance with various wireless signal protocols. RSS sensing mobile device 102, also referred to herein as mobile device 102, may also sense and determine signal connectivity parameters related to ambient or prevailing wireless signals. In particular, RSS sensing mobile device 102 may include location determination capability by way of a GPS module having a GPS receiver, and a communication interface for communicatively coupling to communication network 104, including by sending and receiving cellular data over data and voice channels.

A particular position fingerprint or signature based on any of received wireless communication signal strength and signal connectivity parameters, magnetic field parameters or barometric pressure parameters, and mobile device inertial sensor data may be detected or recorded by RSS sensing mobile device 102, whereupon the fingerprint or signature as detected may be matched to a reference fingerprint, or a reference pattern including a set of fingerprints, in a stored fingerprint map of a given facility made accessible to RSS sensing mobile device module 105 to identify a unique position of RSS sensing mobile device 102 along a pedestrian route. As used herein, term signal connectivity, as distinguished from a signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of RSS sensing mobile device 102 along a sequence of positions that constitute a pedestrian route within, and even adjoining, the indoor facility.

The terms localize, or localization, as used herein refer to determining a unique coordinate position of the mobile device at a specific location along a route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building or multi-level building, for example. In other embodiments, the (x, y, z) coordinates may be expressed either in a local reference frame specific to the mobile device, or in accordance with a global coordinate reference frame. The terms localize or localization as used herein refer to determining an estimated coordinate position (x, y, z) along a indoor route or trajectory being traversed in accompaniment of RSS sensing mobile device 102.

RSS sensing mobile device module 105, constituted of logic instructions executable in a processor of RSS sensing mobile device 102, also referred to as a moving node here in embodiments, enables wireless communication of localization parameters and functionality with server computing device 101.

Figure 2:
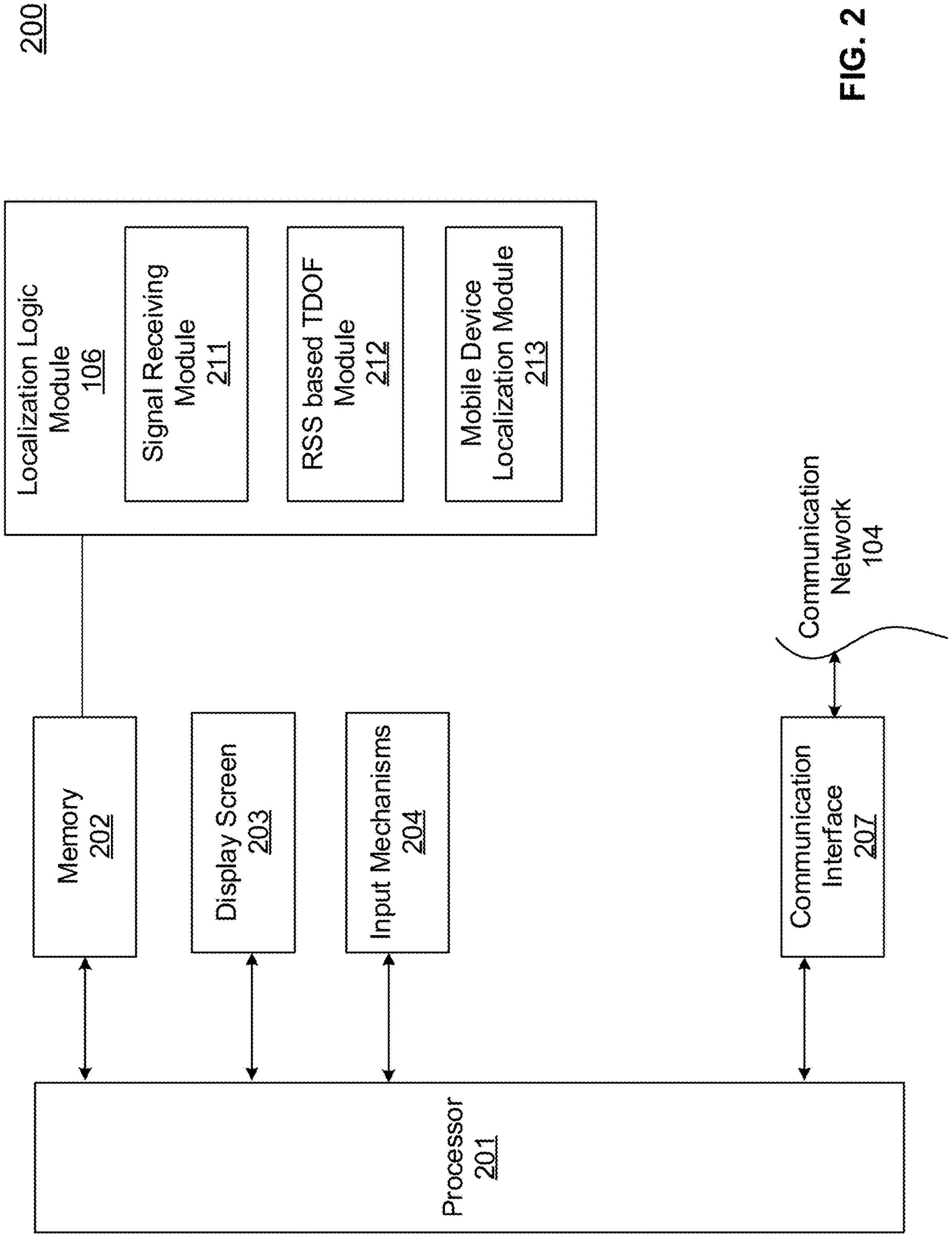
FIG. 2 illustrates, in one example embodiment, an architecture of a server computer device implementing mobile device localization for indoor navigation and positioning.

FIG. 2 illustrates, in one example embodiment, an architecture of server device 101 implementing mobile device localization for indoor navigation and positioning. Server 101 in an embodiment is fixed in position or location relative to access point devices 103*a-n*. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1-6 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with RSS sensing mobile device 102.

Processor 201, uses executable instructions stored in signal receiving module 211 to receive, at a set of fixed nodes, a wireless signal transmission from a moving node.

Processor 201 uses executable instructions stored in RSS based TDOF module 212 to derive a time difference of flight (TDOF) offset amongst the set of fixed nodes and the moving node.

Processor 201 uses executable instructions stored in mobile device localization module 213 to localize the moving node at a given time based at least in part on the TDOF offset.

In embodiments, the moving node comprises a mobile device under traversal within the indoor area.

In embodiments, the set of fixed nodes comprises a set of access point devices in wireless communication with the moving node.

In embodiments, one of the set of fixed nodes comprises the server computing device, the server computing device being fixed in location.

In embodiments, the TDOF offset is derived based at least in part upon a received signal strength (RSS) measurement.

In embodiments, determining the TDOF offset is based at least in part on a time offset of a distance between at least a pair of the set of fixed nodes.

In embodiments, the TDOF time offset is based at least in part on a speed of the wireless signal transmission.

In embodiments, the method further comprises localizing the moving node based at least in part on a time synchronization offset between the set of fixed nodes and the moving node.

In embodiments, the moving node comprises a first time reference frame that is different from a second time reference frame of the set of fixed nodes.

Time of Flight (TOF) is a positioning method that uses the time it takes a signal to travel between a Fixed Node and a Moving Node in order to infer distance between the two nodes and therefore the position of the Moving Node in relation to the Fixed Node. The complication of TOF is that it requires all of the Fixed Nodes as well as the Moving Node to be in the same time reference frame, this is very hard to achieve seeing as the devices are not physically connected.

Time Difference of Flight (TDOF) is another high precision positioning algorithm which is similar to TOF except it allows for the Moving Node to be in its own time frame independent of the Fixed Nodes. This is done by allowing the Moving Node to transmit the signal and having the Fixed Nodes receive. After the data has been collected, the time that the Moving Node transmitted can be solved for within the time reference of the Fixed Node. However, TDOF does require the fixed nodes to be in the same time reference frame.

In the TDOF time offset based synchronization process herein, the moving node transmits a wireless signal having RSS signal characteristics capable of being perceived and measured at a set of fixed access point devices, and in additional embodiments, a server device at a fixed location within an indoor area.

All of the fixed nodes receive a wireless signal transmission from the moving node or mobile device 102 under traversal and in motion. The fixed nodes record the time of receiving the wireless signal transmission.

The schematic and equations for determining TDOF are shown as follows:

$$t_{MN}^{FN1} = \frac{1}{c}\sqrt{(x_{FN1}-x_{MN})^2+(y_{FN1}-y_{MN})^2+(z_{FN1}-z_{MN})^2} + t_{MN}$$

$$\vdots$$

$$t_{MN}^{FN5} = \frac{1}{c}\sqrt{(x_{FN5}-x_{MN})^2+(y_{FN5}-y_{MN})^2+(z_{FN5}-z_{MN})^2} + t_{MN}$$

Where FN stands for Fixed Node, MN stands for Moving Node and c is the speed of the signal. $t_{MN}$ refers to the time the signal was transmitted from the Moving Node, and $t_{MN}^{FN1}$ refers to the time the signal from the Moving node was received by Fixed Node 1. The resulting system of equations can be summarized by the observations and unknown shown as follows. Additionally, this system can be solved using non-Linear least squares.

Observations Unknowns $$\begin{bmatrix} t_{MN}^{FN1} \\ t_{MN}^{FN2} \\ t_{MN}^{FN3} \\ t_{MN}^{FN4} \\ t_{MN}^{FN5} \end{bmatrix} \quad \begin{bmatrix} x_{MN} \\ y_{MN} \\ z_{MN} \\ t_{MN} \end{bmatrix}$$

The TDOF positioning algorithm as described herein requires determination of time synchronization between the Fixed Nodes. Time synchronization between the Fixed Nodes can be achieved by solving for the time offset of each Fixed Node in relation to the reference time of the server or in reference to a selected Fixed Node. This can be done by having each Fixed Node transmit a signal while the other Fixed Nodes receive. This would result in the following system of equations:

$$t_{FN1}^{FN2} = \frac{1}{c}\rho_{FN1}^{FN2} + t_{FN1} + t_o^{FN2}$$

$$\vdots$$

$$t_{FN5}^{FN4} = \frac{1}{c}\rho_{FN5}^{FN4} + t_{FN5} + t_o^{FN4}$$

Where $t_0^{FN}$ refers to the time offset of a given Fixed Node, $\rho_{FNA}^{FNB}$ refers to the distance between Fixed Node A and Fixed Node B, which is known, and c refers to the speed of the signal. With this system of equations, the time offsets of each Fixed Node can be solved for using linear least squares.

In embodiments, the signal times as received at the fixed nodes, from the moving node signal transmission, are used to solve for, and derive, a 3-dimensional location of the moving node simultaneously with the time synchronization offset between the moving node and fixed nodes. In this context, the term simultaneous refers to the fact that the system 100 herein operates asynchronously so time synchronization needs to be established in order to be able to utilize information distances and offset times from the different fixed nodes. In particular, the location (x, y, z) and time offset are both treated as unknowns which can be solved for by setting up a system of equations as described above, with the unknowns can be solved for by using non-Linear least squares technique, in one example.

Figure 3:
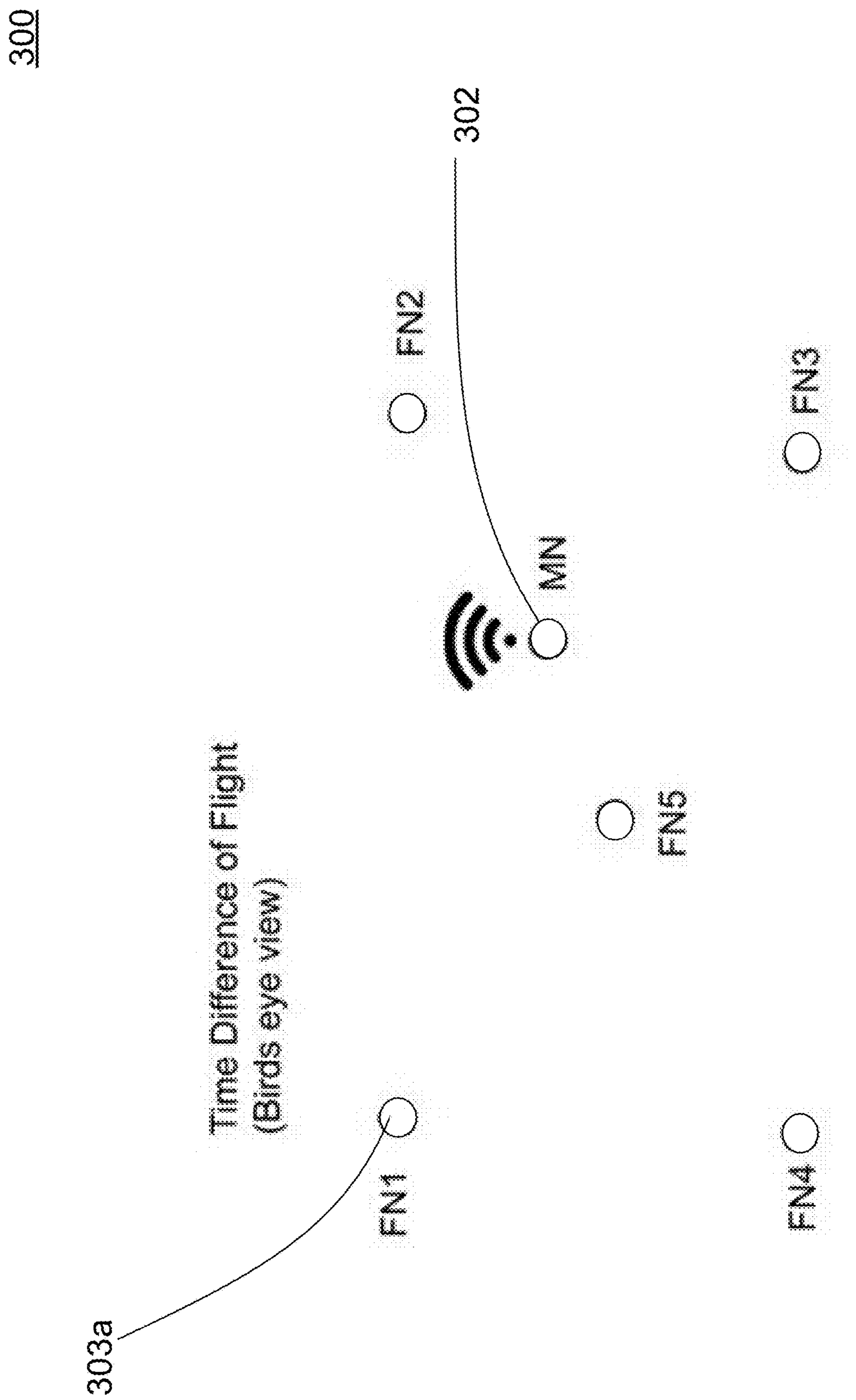
FIG. 3 illustrates, in another example embodiment, a system for mobile device localization for indoor navigation and positioning.

FIG. 3 illustrates, in another example embodiment, a system 300 for mobile device localization for indoor navigation and positioning, in which reference is made to the examples of FIGS. 1-2 for purposes of illustrating suitable components or elements being described. Server device 101 is fixed in location with an indoor area, in wireless communication with a set of fixed nodes 303*a-n* and a moving node 302. In embodiments, the set of fixed nodes 303*a-n* comprise a set of access point devices in wireless communication with moving node 302, where moving node 302 comprises a mobile device in motion traversing the indoor area.

Figure 4:
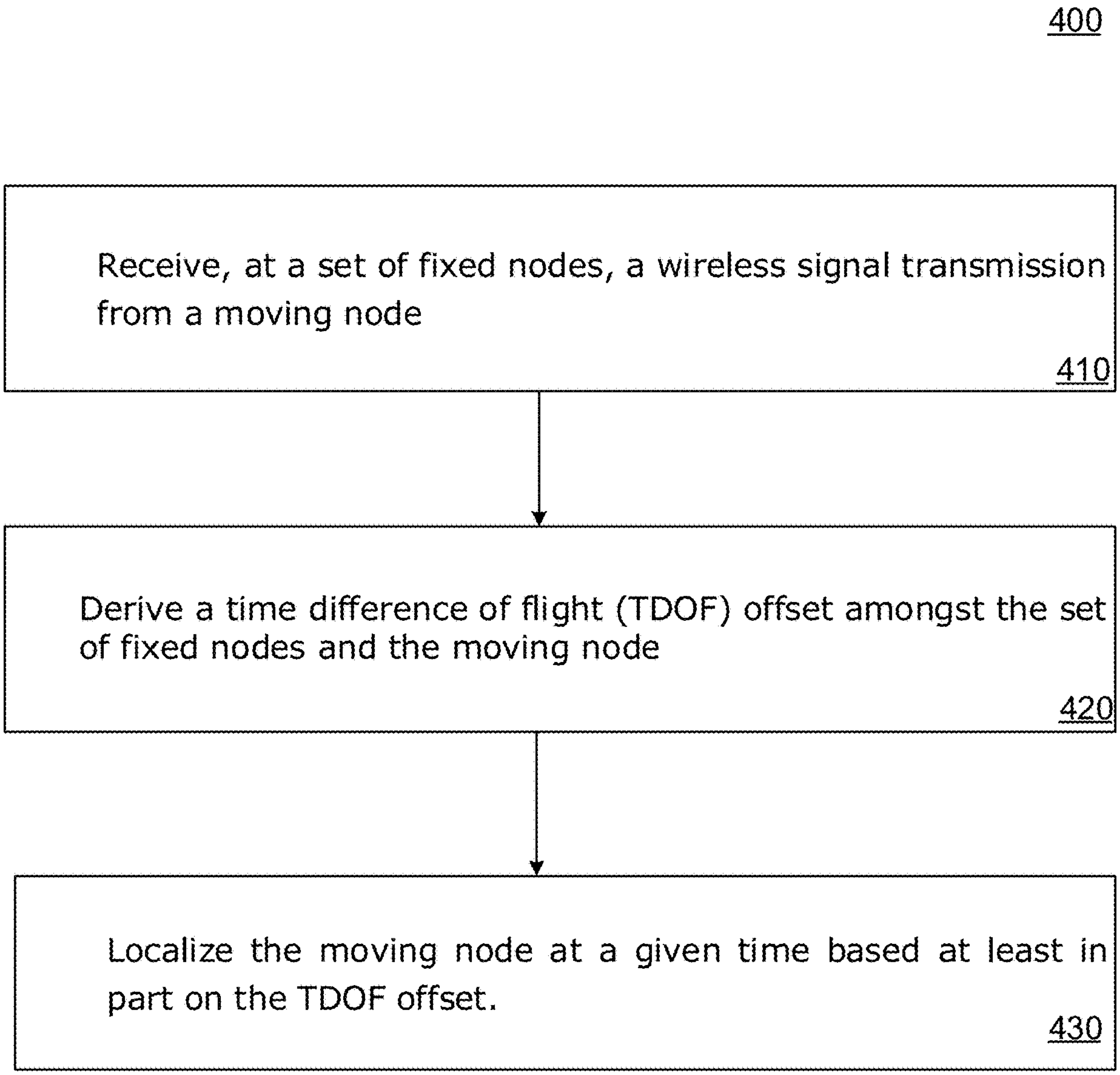
FIG. 4 illustrates, in an example embodiment, a method of mobile device localization for indoor navigation and positioning.

FIG. 4 illustrates in an example embodiment, method 300 of time-based synchronization for localizing a moving node, in one embodiment mobile device 102. In describing examples of FIG. 4, reference is made to the examples of FIGS. 1-3 for purposes of illustrating suitable components or elements for performing a step or sub-step being described.

At step 401, processor 201 executes the instructions of signal receiving module 211 to receive, at a set of fixed nodes, a wireless signal transmission from a moving node.

At step 402, processor 201 executes the instructions of RSS based TDOF module 212 to derive a time difference of flight (TDOF) offset amongst the set of fixed nodes and the moving node.

At step 403, processor 201 executes the instructions of mobile device localization module 213 to localize the moving node at a given time based at least in part on the TDOF offset.

In embodiments, the moving node comprises a mobile device under traversal within the indoor area.

In embodiments, the set of fixed nodes comprises a set of access point devices in wireless communication with the moving node.

In embodiments, one of the set of fixed nodes comprises the server computing device, the server computing device being fixed in location.

In embodiments, the TDOF offset is derived based at least in part upon a received signal strength (RSS) measurement.

In embodiments, determining the TDOF offset is based at least in part on a time offset of a distance between at least a pair of the set of fixed nodes.

In embodiments, the TDOF time offset is based at least in part on a speed of the wireless signal transmission.

In embodiments, the method further comprises localizing the moving node based at least in part on a time synchronization offset between the set of fixed nodes and the moving node.

In embodiments, the moving node comprises a first time reference frame that is different from a second time reference frame of the set of fixed nodes.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method, executed in a processor of a server computing device, of localizing a moving node, the method comprising:

receiving, at a set of fixed nodes, a wireless signal transmission from a moving node, wherein the moving node comprises a first time reference frame that is different from a second time reference frame of the set of fixed nodes;

deriving a time difference of flight (TDOF) offset amongst the set of fixed nodes and the moving node, the deriving includes determining a time synchronization between the set of fixed nodes, the time synchronization comprises computing a time offset of each fixed node in relation to a reference time frame of the server computing device, and wherein deriving the TDOF offset is based at least in part on the time offset of a distance between at least a pair of the set of fixed nodes; and localizing, simultaneously with the deriving, the moving node at a given time based at least in part on the TDOF offset.

2. The method of claim 1 wherein the moving node comprises a mobile device under traversal within the indoor area.

3. The method of claim 1 wherein the set of fixed nodes comprises a set of access point devices in wireless communication with the moving node.

4. The method of claim 3 wherein one of the set of fixed nodes comprises the server computing device, the server computing device being fixed in location.

5. The method of claim 1 wherein the TDOF offset is derived based at least in part upon a received signal strength (RSS) measurement.

6. The method of claim 1 wherein the TDOF time offset is based at least in part on a speed of the wireless signal transmission.

7. The method of claim 1 further comprising localizing the moving node based at least in part on a time synchronization offset between the set of fixed nodes and the moving node.

8. The method of claim 1 wherein the indoor area comprises one of a manufacturing facility, a shopping mall, a warehouse, an airport facility, a hospital facility, a university campus facility or any at least partially enclosed building.

9. A server computing system comprising:

a processor; and a memory including instructions executable in the processor to:

receive, at a set of fixed nodes, a wireless signal transmission from a moving node, wherein the moving node comprises a first time reference frame that is different from a second time reference frame of the set of fixed nodes;

derive a time difference of flight (TDOF) offset amongst the set of fixed nodes and the moving node, the deriving includes determining a time synchronization between the set of fixed nodes, the time synchronization comprises computing a time offset of each fixed node in relation to a reference time frame of the server computing device, and wherein deriving the TDOF offset is based at least in part on the time offset of a distance between at least a pair of the set of fixed nodes; and localize, simultaneously with the deriving, the moving node at a given time based at least in part on the TDOF offset.

10. The system of claim 9 wherein the moving node comprises a mobile device under traversal within the indoor area.

11. The system of claim 9 wherein the set of fixed nodes comprises a set of access point devices in wireless communication with the moving node.

12. The system of claim 11 wherein one of the set of fixed nodes comprises the server computing device, the server computing device being fixed in location.

13. The system of claim 9 wherein the TDOF offset is derived based at least in part upon a received signal strength (RSS) measurement.

14. The system of claim 9 wherein the TDOF time offset is based at least in part on a speed of the wireless signal transmission.

15. The system of claim 9 further comprising localizing the moving node based at least in part on a time synchronization offset between the set of fixed nodes and the moving node.

16. The system of claim 9 wherein the indoor area comprises one of a manufacturing facility, a shopping mall, a warehouse, an airport facility, a hospital facility, a university campus facility or any at least partially enclosed building.

* * * * *